US008560011B2

(12) United States Patent
Fujimoto

(10) Patent No.: US 8,560,011 B2
(45) Date of Patent: Oct. 15, 2013

(54) TERMINAL DEVICE WITH IMAGE DISPLAY FUNCTION

(75) Inventor: Makoto Fujimoto, Kyoto (JP)

(73) Assignee: Kyocera Corporation, Kyoto (JP)

( * ) Notice: Subject to any disclaimer, the term of this patent is extended or adjusted under 35 U.S.C. 154(b) by 144 days.

(21) Appl. No.: 12/863,586

(22) PCT Filed: Jan. 23, 2009

(86) PCT No.: PCT/JP2009/051077

§ 371 (c)(1),
(2), (4) Date: Aug. 3, 2010

(87) PCT Pub. No.: WO2009/093689

PCT Pub. Date: Jul. 30, 2009

(65) Prior Publication Data

US 2010/0291969 A1      Nov. 18, 2010

(30) Foreign Application Priority Data

Jan. 24, 2008    (JP) .................................. 2008-013684

(51) Int. Cl.
*H04M 1/00*    (2006.01)
(52) U.S. Cl.
USPC ......... 455/556.1; 455/566; 345/622; 715/804
(58) Field of Classification Search
USPC ........ 455/556.1, 566; 715/804; 345/173, 629, 345/622
See application file for complete search history.

(56) References Cited

U.S. PATENT DOCUMENTS

| | | | | |
|---|---|---|---|---|
| 6,653,948 | B1 * | 11/2003 | Kunimatsu et al. ....... | 340/995.19 |
| 7,209,149 | B2 * | 4/2007 | Jogo ............................ | 345/622 |
| 7,703,041 | B2 * | 4/2010 | Ito et al. ........................ | 715/804 |
| 8,024,005 | B2 * | 9/2011 | Kwak et al. ................... | 455/566 |

(Continued)

FOREIGN PATENT DOCUMENTS

| | | |
|---|---|---|
| JP | 2005-012493 | 1/2005 |
| JP | 2007-082223 | 3/2007 |
| JP | 2007-228504 | 9/2007 |

OTHER PUBLICATIONS

International Search Report for PCT/JP2009/051077 dated Mar. 17, 2009.

(Continued)

*Primary Examiner* — Ping Hsieh
*Assistant Examiner* — Chung-Tien Yang
(74) *Attorney, Agent, or Firm* — Procopio, Cory, Hargreaves & Savitch LLP

(57) ABSTRACT

[Object]
To provide a terminal device with an image display function that enables to effectively enhance viewability of image contents and operability of the terminal device.
[Constitution]
In response to input of image contents to a CPU 100 through a TV module 200, a determining section 110 acquires genre information of the image contents. The determining section 110 determines the genre based on the acquired genre information, and transmits the determination result to a display control section 120. The display control section 120 reads out, from a memory 700, a screen mode and a disposition pattern corresponding to the genre determined by the determining section 110 in accordance with the contents of a screen setting table; and sets a display area R1 and an operation area R2 in accordance with the readout screen mode. Then, the display control section 120 displays function buttons in the operation area R2, and at the same time, displays the image contents in the display area R1 in accordance with the readout disposition pattern.

8 Claims, 11 Drawing Sheets

(56) References Cited

U.S. PATENT DOCUMENTS

| | | |
|---|---|---|
| 2007/0057866 A1 | 3/2007 | Lee et al. |
| 2008/0222690 A1* | 9/2008 | Kim .............................. 725/110 |
| 2009/0170565 A1* | 7/2009 | Okuda et al. .................. 455/566 |

OTHER PUBLICATIONS

International Preliminary Report on Patentability issued in corresponding application PCT/JP2009/051077 dated Aug. 5, 2010, 12 pages.

\* cited by examiner

TERMINAL DEVICE WITH IMAGE DISPLAY FUNCTION

TECHNICAL FIELD

The invention relates to a terminal device with an image display function, and more particularly to a mobile terminal device such as a mobile phone and a PDA (Personal Digital Assistant).

BACKGROUND ART

Currently, mobile phones for allowing users to view image contents (such as television programs) have been commercialized and spread. For instance, in the mobile phone, there is known an arrangement, wherein a mobile phone main body is constituted of two collapsible housings, one of the housings has a display section (a display surface) for displaying e.g. image contents, and the other of the housings has a key input section, respectively.

DISCLOSURE OF THE INVENTION

Problem to be Solved by the Invention

In the above mobile phone, a mobile phone main body may be constituted of one housing, and the entirety of a front surface of the mobile phone main body may constitute a display surface. In this arrangement, for instance, operation buttons are disposed on the display surface as a touch panel. This arrangement enables to divide the display surface into an area for displaying image contents, and an area for displaying operation buttons, and the touch panel is disposed in the area for displaying operation buttons.

In the above arrangement, since the entirety of the front surface of the mobile phone main body can be used for displaying images, there is no need of fixing the sizes of the area for displaying image contents, and the area for displaying operation buttons, and the ratio between the areas may be changed, as necessary.

In the above arrangement, if the size of the area for displaying image contents is increased, although the user is allowed to view images on a large screen, the disposition of operation buttons is restricted, and the operability of the user is lowered. On the other hand, if the size of the area for displaying operation buttons is increased, although the operability of operation buttons is enhanced, the area for displaying image contents is restricted, and the viewability of image contents is lowered.

As described above, in the case where the entirety of a front surface of a mobile phone constitutes a display surface, it is necessary to distribute the area for displaying image contents and the area for displaying operation buttons on the display surface, considering both of the viewability of image contents and the operability of the user.

In view of the above, an object of the invention is to provide a terminal device with an image display function that enables to effectively enhance viewability of image contents and operability of the terminal device.

Means to Solve the Problem

A terminal device with an image display function of the invention includes a display section; a display control section which divides a display area of the display section into a first display area for displaying image contents, and a second display area for allowing a user to perform an input operation; a storing section which stores first information relating to a ratio between the first display area and the second display area in association with a genre of the image contents; and a determining section which determines the genre of the image contents to be displayed. In this arrangement, the display control section reads out, from the storing section, the first information corresponding to the genre determined by the determining section, and divides the display area into the first display area and the second display area, based on the first information.

Figure 1:
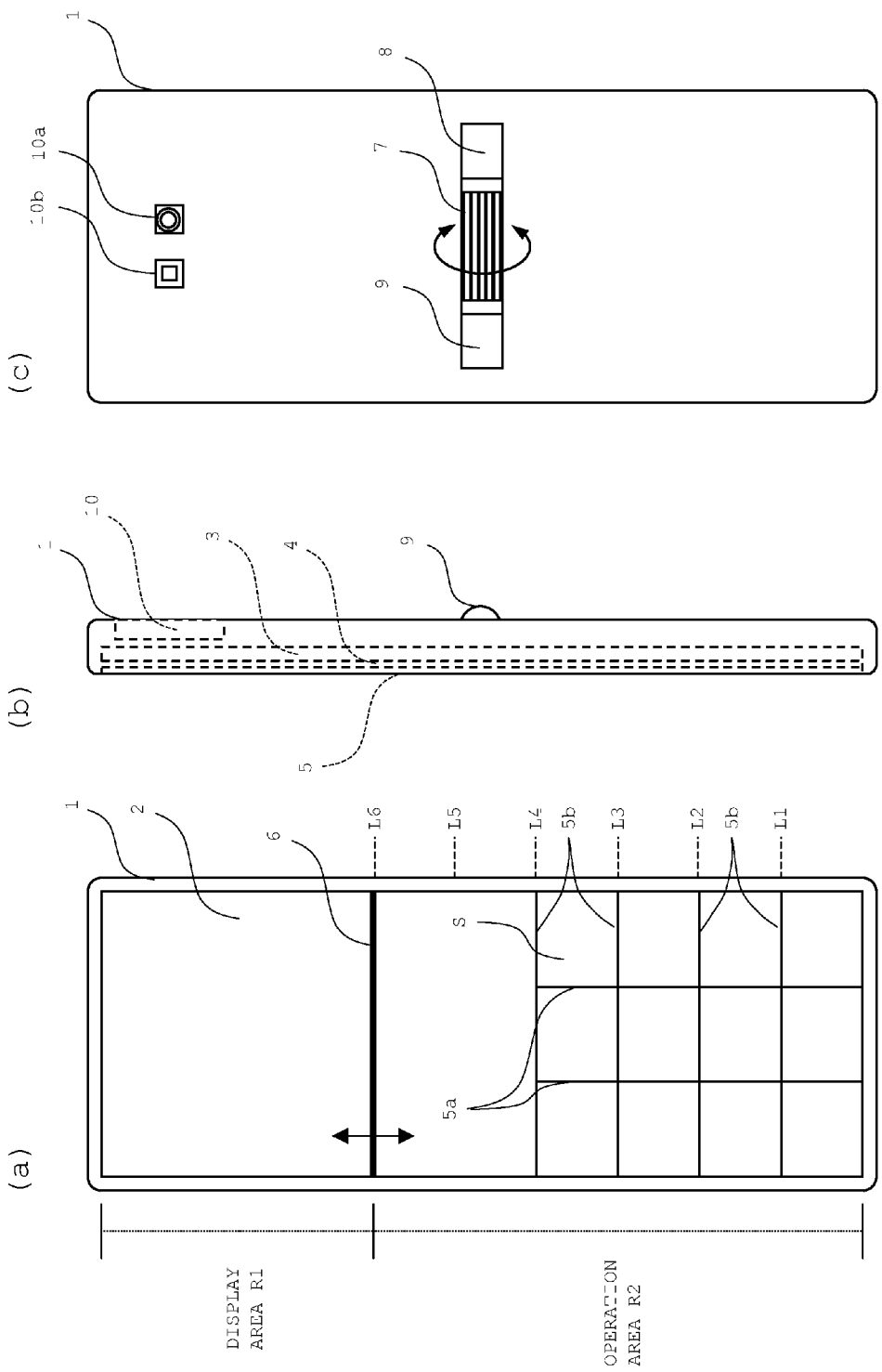
FIG. 1 is diagram showing an arrangement of a mobile phone in accordance with an embodiment.

The drawings are provided mainly for describing the invention, and do not limit the scope of the invention.

BEST MODE FOR CARRYING OUT THE INVENTION

In the following, an embodiment of the invention is described referring to the drawings. In the embodiment, a surface on which an image is displayed is called as a display surface, and an image to be displayed on the entirety of the display surface is called as a display screen (corresponding to a "display area" recited in the claims).

FIG. 1 is diagram showing an arrangement of a mobile phone, as an embodiment of a terminal device with an image display function of the invention. FIG. 1(a), FIG. 1(b), and FIG. 1(c) are respectively a front view, a right side view, and a rear view.

Referring to FIG. 1, the mobile phone of the embodiment has a cabinet 1 constituting an outer casing of the mobile phone. The cabinet 1 has a rectangular shape with a vertically long length in front view. A display surface 2 is formed substantially on the entirety of a front surface of the cabinet 1. Similarly to the cabinet 1, the display surface 2 has a rectangular shape with a vertically long length.

The display surface 2 is constituted of a liquid crystal panel 3. A touch panel 4 is disposed in front of the liquid crystal panel 3. The touch panel 4 detects a position on the display surface 2, which has been depressed by the user, and outputs a signal (a position signal) indicating the position. A protection panel 5 is disposed in front of the touch panel 4. The protection panel 5 is adapted to protect the touch panel 4 from damages. Vertical grooves 5a and horizontal grooves 5b are formed in a grid pattern in a lower area on a surface of the protection panel 5. When a character and/or a symbol representing a function is displayed in a corresponding square region S defined by the grooves 5a and 5b, each of the square regions S serves as a function button (a soft key) for allowing the user to perform various operations. In the case where an operation area R2 is formed in an area including an area where the square regions S are not formed, function buttons for allowing the user to recognize a boundary to an adjacent function are displayed in the area where the square regions S are not formed by e.g. encircling a character representing the function by a square mark.

A horizontally extending bar 6 is included in a display screen to be displayed on the display surface 2. The bar 6 divides the display screen into upper and lower two areas. The upper area with respect to the bar 6 serves as a display area R1 (corresponding to a first display area), and the lower area with respect to the bar 6 serves as the operation area R2 (corresponding to a second display area). A television image, a photographic image, a text image, or a like image is displayed on the display area R1. Various function buttons are disposed in the operation area R2. The user is allowed to move the bar in up and down directions on the display screen by manipulating a jog dial 7.

The jog dial 7 is disposed at a center portion on a back surface of the cabinet 1, and is rotated in up and down directions. When the jog dial 7 is rotated in upward direction, the bar 6 is moved in upward direction; and when the jog dial 7 is rotated in downward direction, the bar 6 is moved in downward direction. An R button 8 and an L button 9 are disposed on the left and on the right of the jog dial 7, respectively. The user is allowed to perform a predetermined operation by operating the R button 8 and the L button 9.

A camera module 10 is provided on an upper part in the interior of the cabinet 1. A imaging lens 10a and a flash section 10b of the camera module 10 are provided on the back surface of the cabinet 1.

In the mobile phone, the display screen is switchable between various modes (including mail mode, television mode, music mode, internet mode, and camera mode) by fixing the bar 6 to a predetermined position.

In view of the above, plural fixed positions (e.g. L1 through L6) are set on the display screen in up and down directions. For instance, in the case where the user manipulates the jog dial 7, moves the bar 6 to the fixed position L5, and depresses the R button 8 in a state that the bar 6 is in the fixed position L5, the display screen in the television mode is displayed. Further, in the case where the user moves the bar 6 to the fixed position L6, and depresses the R button 8 thereat, the display screen in the television mode is switched to the display screen in the mail mode.

Figure 2:
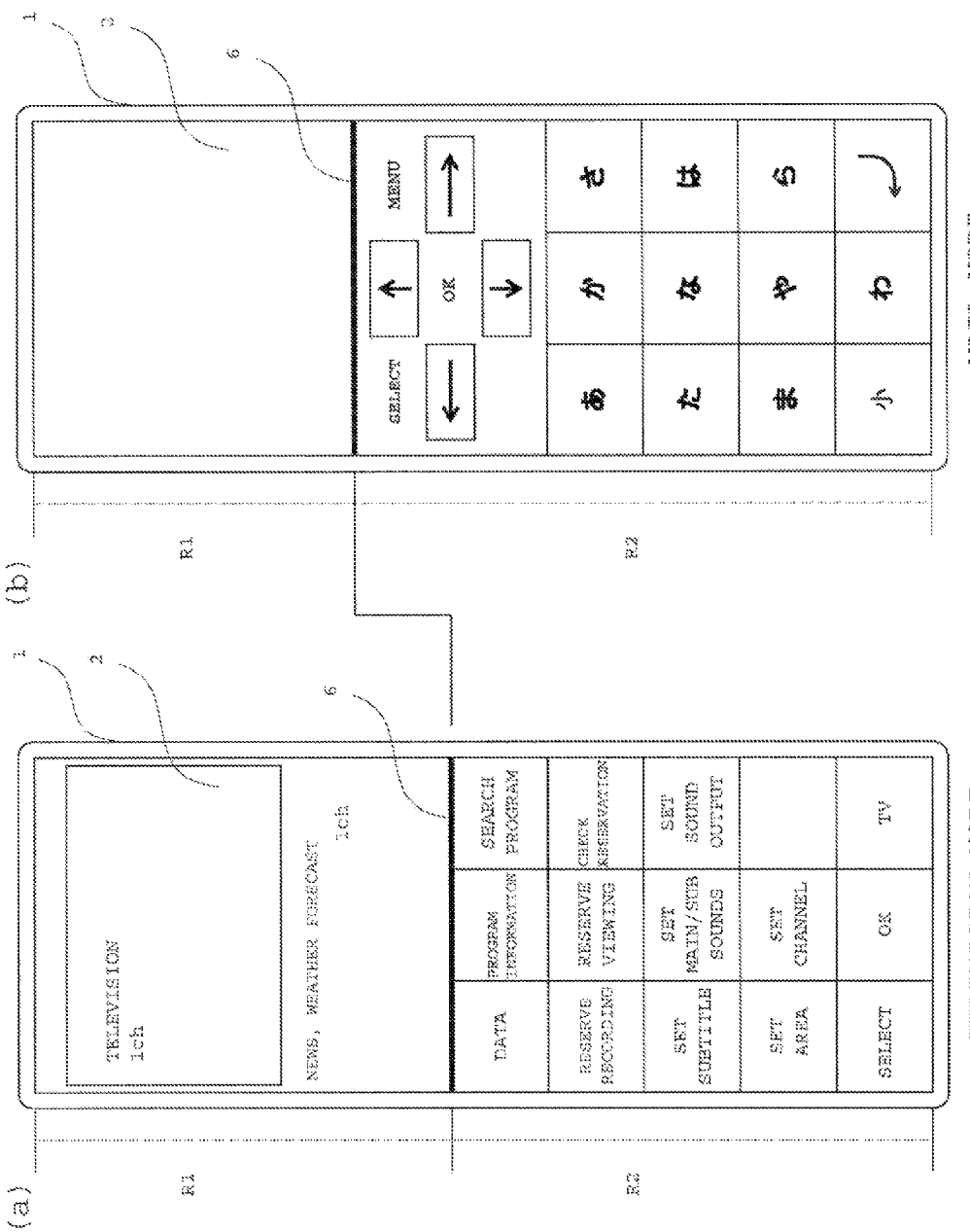
FIG. 2 is diagram showing screen display examples of a television mode and a mail mode in the mobile phone of the embodiment.

FIG. 2(a) shows a screen display example in the television mode. FIG. 2(b) shows a screen display example in the mail mode. In the television mode, as shown in FIG. 2(a), image contents are displayed in the display area R1, and plural function buttons for allowing the user to perform operations relating to image display are displayed in the operation area R2. In the mail mode, as shown in FIG. 2(b), for instance, inputted characters are displayed in the display area R1, and function buttons for allowing the user to input a mail message or transmit/receive mails are displayed in the operation area R2.

Figure 3:
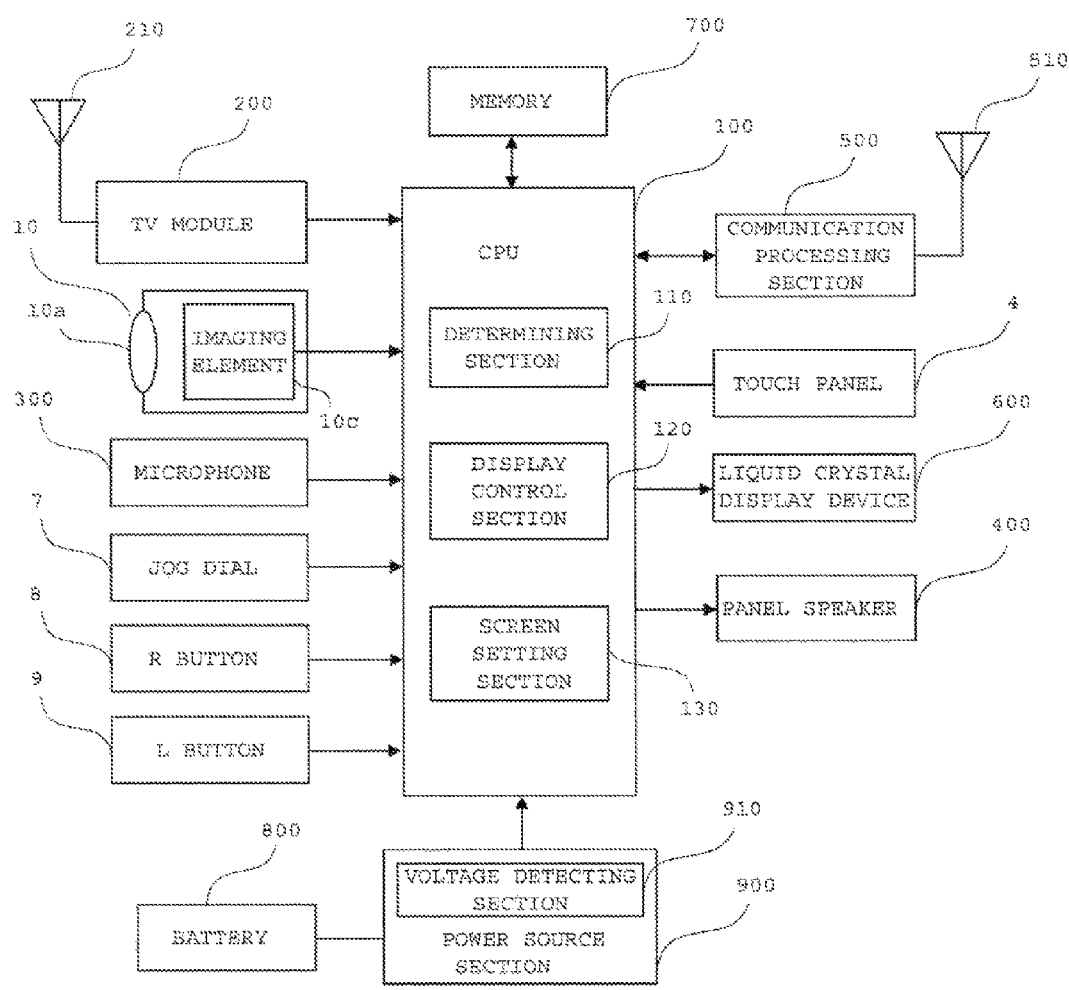
FIG. 3 is a block diagram showing a circuit configuration of the mobile phone of the embodiment.

FIG. 3 is a block diagram showing a circuit configuration of the mobile phone in accordance with the embodiment. The mobile phone includes a CPU 100, a TV module 200, a microphone 300, a panel speaker 400, a communication processing section 500, a liquid crystal display device 600, a memory 700, a battery 800, and a power source section 900, in addition to the aforementioned components described referring to FIG. 1. The liquid crystal display device 600 corresponds to a "display section" recited in the claims, and the memory 700 corresponds to a "storing section" recited in the claims.

The TV module 200 includes a TV tuner, converts a radio wave such as a terrestrial digital broadcast wave or a terrestrial analog broadcast wave received through an antenna 210 into a video signal, and transmits the video signal to the CPU 100.

The camera module 10 includes an imaging element 10c, in addition to the imaging lens 10a and the flash section 10b. The imaging lens 10a forms an image of a subject on the imaging element 10c. The imaging element 10c is constituted of e.g. a CCD, generates an image pickup signal corresponding to a picked up image, and transmits the image pickup signal to the CPU 100.

The microphone 300 converts a sound signal into an electrical signal, and transmits the electrical signal to the CPU 100. The panel speaker 400 reproduces a sound signal from the CPU 100 as a sound.

The communication processing section 500 converts e.g. a sound signal, an image signal, or a text signal from the CPU 100 into a radio signal, and transmits the radio signal to a base station through an antenna 510; and converts the radio signal received through the antenna 510 into e.g. a sound signal, an image signal, or a text signal, and transmits the signal to the CPU 100.

The liquid crystal display device 600 includes the liquid crystal panel 3, and a backlight device (not shown) serving as a light source of the liquid crystal panel 3, and displays an image on the liquid crystal panel 3 by a drive signal from the CPU 100.

The memory 700 saves e.g. image data photographed by the camera module 10, or image data or text data (mail data) acquired from an external device through the communication processing section 500 in a predetermined file format. The memory 700 also saves image contents (such as television programs and movies) acquired from an external device by the TV module 200 or the communication processing section 500, along with genre information of the image contents.

The battery 800 supplies an electric power to the CPU 100 and various parts of the mobile phone other than the CPU 100. The battery 800 is constituted of a secondary battery. The battery 800 is connected to the power source section 900.

The power source section 900 converts a voltage of the battery 800 into a voltage of a required level for the respective parts, and supplies the voltage to the respective parts. Further, the power source section 900 supplies an electric power supplied through an input section (not shown) of an external power source to the battery 800 to charge the battery 800. The power source section 900 is provided with a voltage detecting section 910. The voltage detecting section 910 detects a voltage of the battery 800, and supplies the voltage to the CPU 100.

The CPU 100 outputs a control signal to the respective parts such as the panel speaker 400 and the liquid crystal display device 600, based on an input signal from the respective parts such as the touch panel 4, the jog dial 7, the R button 8, the L button 9, the microphone 300, and the imaging element 10c to thereby perform a communication operation or operations in various modes (including mail mode, internet mode, television mode, and camera mode). The CPU 100 also determines the residual amount of the battery 800, based on a voltage signal from the voltage detecting section 910.

The CPU 100 has a determining section 110, a display control section 120, and a screen setting section 130. The determining section 110 determines the genre of image contents acquired from an external device by the TV module 200 or the communication processing section 500. For instance, in the case where image contents are transmitted by a terrestrial digital broadcast wave, genre information is in an EIT (Event Information Table) included in the broadcast wave. The determining section 110 determines the genre of image contents based on the genre information in the EIT. The screen setting section 130 corresponds to a "changing section" and a "key pattern setting section" recited in the claims.

Further, in the case where the image contents are image contents to be distributed by streaming from a server, or image contents to be downloaded from a server, the user is allowed to acquire genre information of the image contents from the server in accessing the server. The determining section 110 determines the genre of the image contents, based on the genre information acquired from the server along with the image contents.

In the case where image contents are transmitted by a terrestrial analog broadcast wave, genre information is not included in the broadcast wave itself. In this case, the user accesses e.g. the broadcast station in advance by using the mobile phone to acquire EPG (electronic program guide). Genre information of television programs (image contents) is included in the EPG. The determining section 110 determines the genre of image contents based on the EPG byway of the time at which the image contents have been received, and the channel through which the image contents have been received.

In the case where image contents are recorded in the memory 700, genre information is recorded with the image contents. Accordingly, in the case where image contents are read out from the memory 700, the determining section 110 is operable to determine the genre by reading out the genre information along with the image contents.

The display control section 120 generates an image to be displayed on the liquid crystal display device 600 within a memory (not shown) serving as a work area prepared in the CPU 100, and outputs an image signal (an RGB signal) to the liquid crystal display device 600 for causing the liquid crystal display device 600 to display the generated image. The display control section 120 also acquires e.g. image data transmitted from the imaging element 10c, image data saved in the memory 700, or image data (image contents) received through the TV module 200 or the communication processing section 500. Then, the display control section 120 generates an image signal (an RGB signal) based on the acquired image data, and outputs the generated image signal to the liquid crystal display device 600. The liquid crystal panel 3 of the liquid crystal display device 600 i.e. the display surface 2 displays an image (including video) in accordance with the image signal.

As will be described later, the screen setting section 130 performs various settings relating to a display screen in the television mode, based on a setting operation by the user.

In the mobile phone of this embodiment, when the mobile phone is in the television mode, a display screen depending on the genre of image contents is displayed in displaying the image contents.

Various data for screen display in the television mode are stored in the memory 700. Specifically, as shown in FIG. 4(a), the memory 700 stores therein data for setting the ratio between the display area R1 and the operation area R2 to two different screen modes (a small-screen mode and a large-screen mode).

In the small-screen mode, an image is displayed with a vertically long length in the display area R1. In the large-screen mode, an image is displayed with a horizontally long length in the display area R1. The display area R1 in the large-screen mode is large, as compared with the display area R1 in the small-screen mode. Accordingly, in the large-screen mode, an image is displayed with a large size. The operation area R2 in the small-screen mode is large, as compared with the operation area R2 in the large-screen mode. Accordingly, function buttons of an increased number are displayed in the operation area R2 in the small-screen mode.

Figure 4:
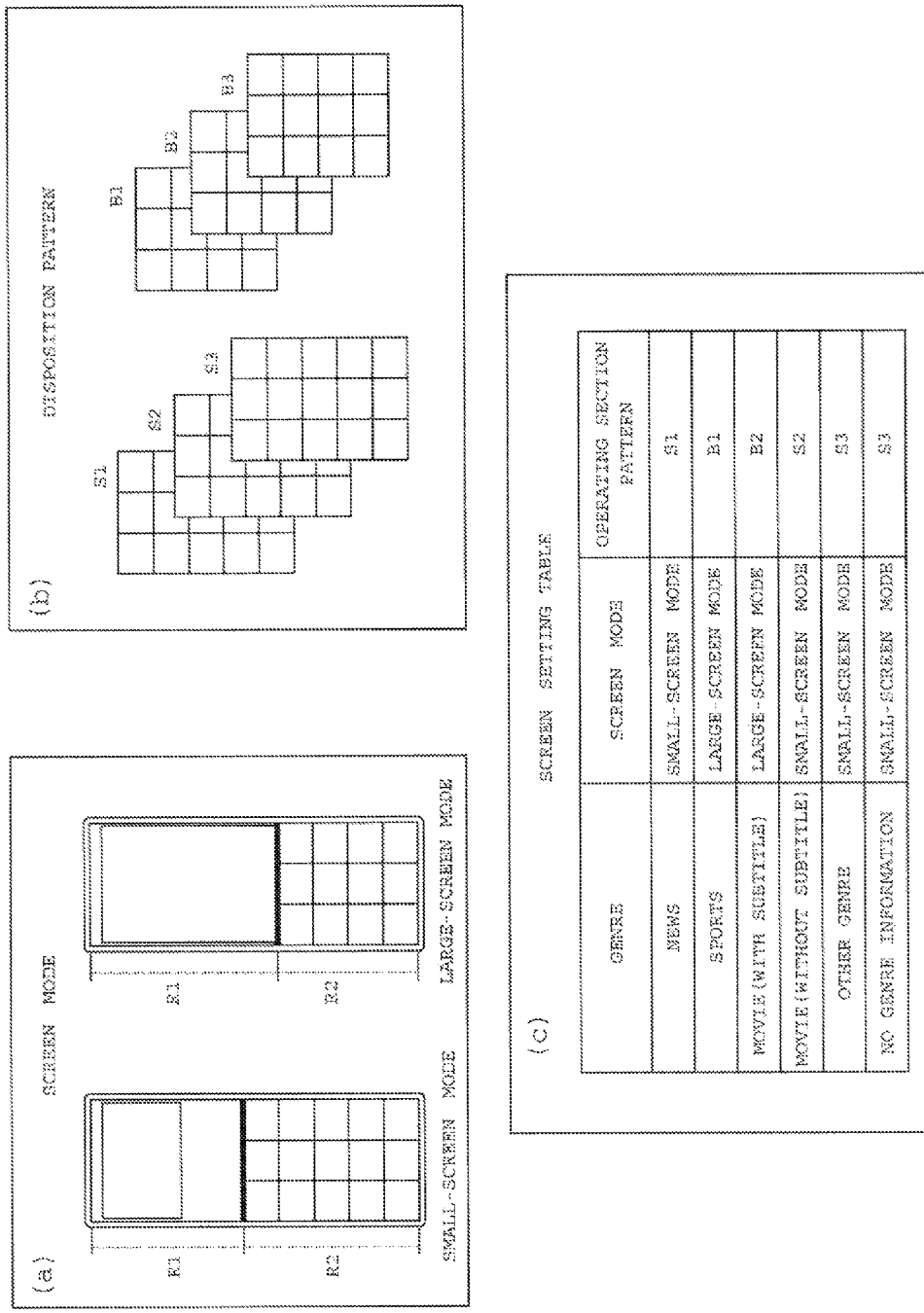
FIG. 4 is diagram for describing various data stored in a memory and for use in displaying a screen in the television mode in the mobile phone of the embodiment.

Further, as shown in FIG. 4(b), plural data (e.g. patterns S1 through S3) relating to disposition patterns of function buttons in the small-screen mode are stored in the memory 700. Further, plural data (e.g. patterns B1 through B3) relating to disposition patterns of function buttons in the large-screen mode are stored in the memory 700. The kinds and the arrangement positions of function buttons are different from each other with respect to each of the disposition patterns.

Further, as shown in FIG. 4(c), a screen setting table is stored in the memory 700. In the screen setting table, screen modes and disposition patterns corresponding to various genres such as "news" and "sports" are set in relation to each other. For instance, in the case of "news", since the user is allowed to sufficiently know the contents through sounds, as well as through images, the screen mode is set to the small-screen mode. In the case of "sports", since images are main contents, the screen mode is set to the large-screen mode so that the user can easily view the details. In the case of movies with subtitles, the screen mode is set to the large-screen mode so that the user can easily read the subtitles. Further, a screen mode and a disposition pattern corresponding to "no genre information" are set in the screen setting table so that the user can select a screen mode in the case where there is no genre information. The screen setting table is set to a certain default value at the time of manufacturing the mobile phone. As will be described later, the user is allowed to change the contents of the screen setting table.

Figure 5:
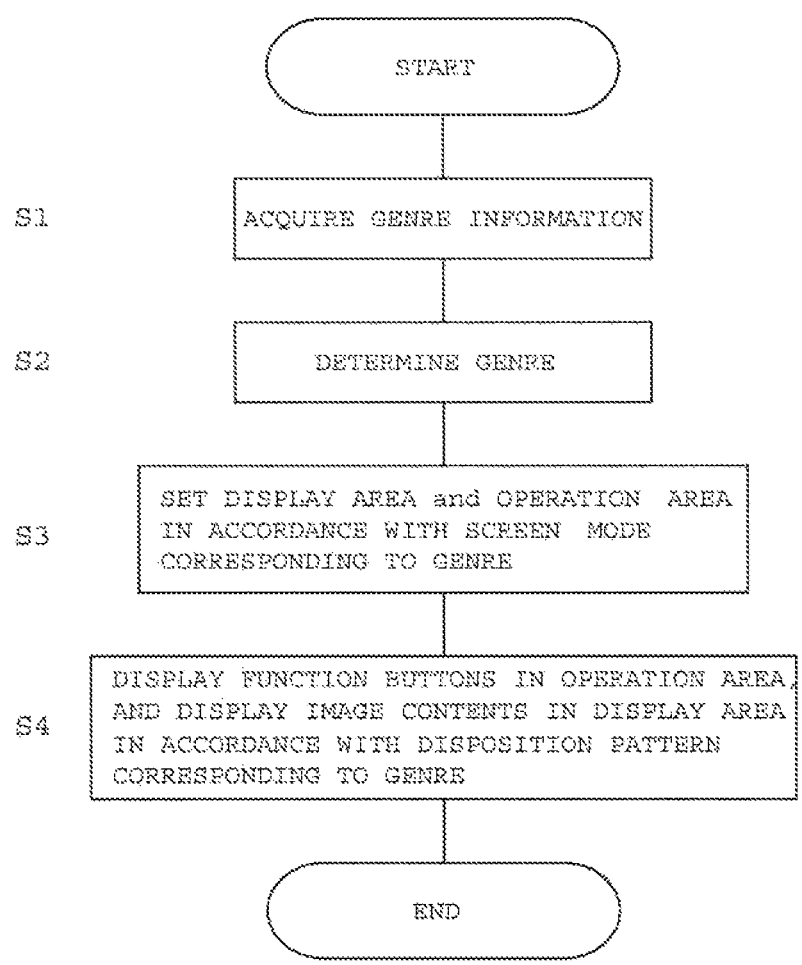
FIG. 5 is a flowchart for describing a screen display control in the television mode in the mobile phone of the embodiment.
Figure 6:
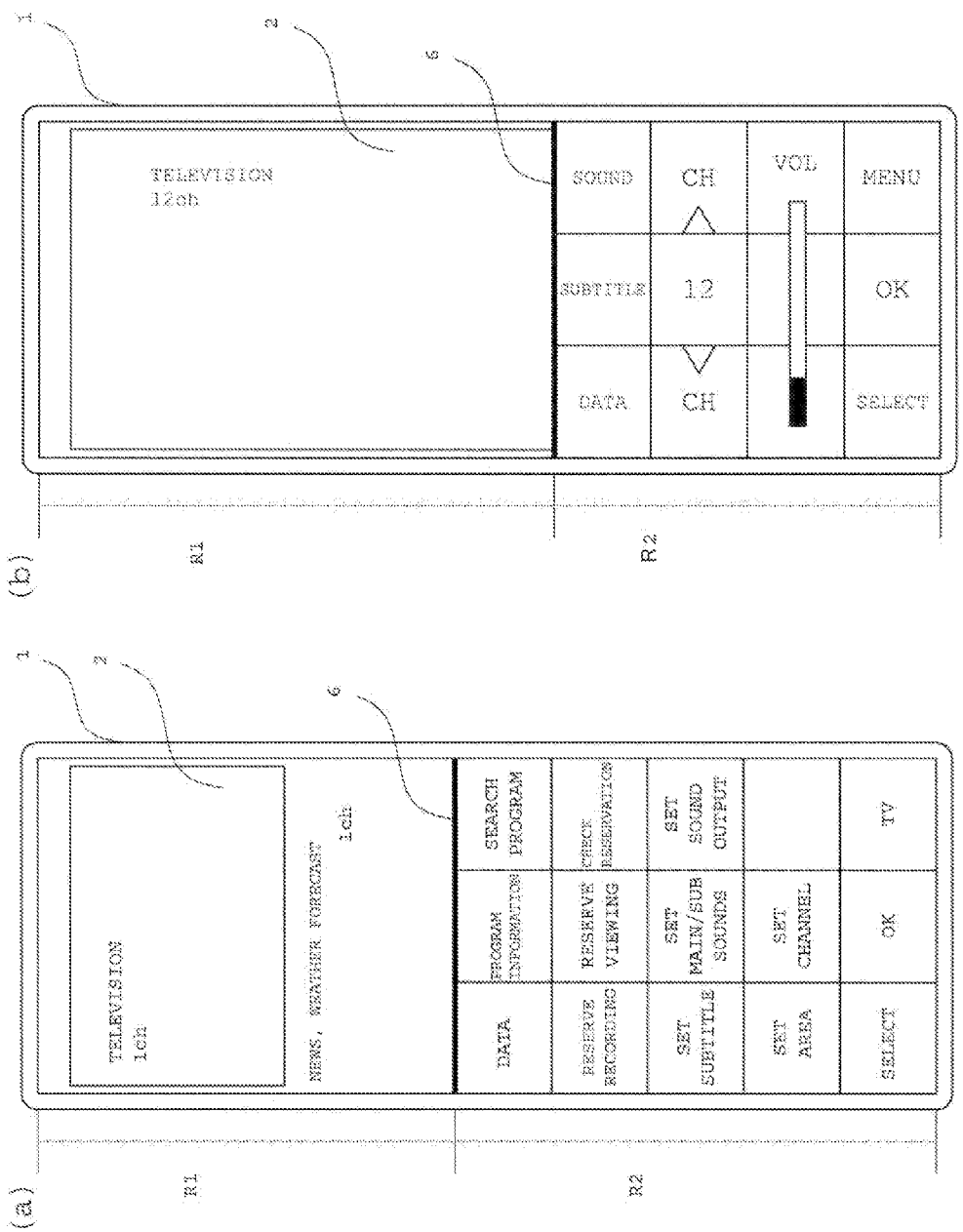
FIG. 6 is diagram showing screen display examples of a display screen in the television mode to be displayed based on a genre determination in the mobile phone of the embodiment.

FIG. 5 is a flowchart for describing a screen display control in the television mode. FIG. 6 is diagram showing screen display examples of a display screen in the television mode to be displayed based on a genre determination.

An operation of the screen display control is described referring to FIG. 5. As described above, by manipulating the jog dial 7, the screen mode is switched to the television mode. For instance, image contents are inputted to the CPU 100 through the TV module 200. Firstly, the determining section 110 acquires genre information of the image contents (Step S1). The determining section 110 determines the genre based on the acquired genre information (Step S2), and outputs the determination result to the display control section 120. In performing the above operation, if there is no genre information, a determination result indicating no genre information is outputted to the display control section 120.

The display control section 120 reads out, from the memory 700, a screen mode and a disposition pattern corresponding to the genre (including a determination result "no genre information") determined by the determining section 110 in accordance with the contents of the screen setting table. Then, the display control section 120 sets the display area R1 and the operation area R2 in accordance with the readout screen mode (Step S3). Then, the display control section 120 outputs an image signal to the liquid crystal display device 600 in accordance with the readout disposition pattern, and causes the liquid crystal display device 600 to display function buttons in the operation area R2. Simultaneously, the display control section 120 outputs an image signal of image contents, and causes the liquid crystal display device 600 to display the image contents in the display area R1 (Step S4).

Thus, for instance, in the case where the image contents are a news program, as shown in FIG. 6(a), a display screen in the small-screen mode, wherein the image screen is small and the number of function buttons is large, is displayed. Further, in the case where the image contents are a sports program, as shown in FIG. 6(b), a display screen in the large-screen mode, wherein the image screen is large and the number of function buttons is small, is displayed.

As described above, in the case of a news program, since the size of the operation area R2 can be increased by the size reduction of the display area R1, the number of function buttons can be increased, thereby enhancing the operability of the user. On the other hand, in the case of a sports program, since the size of the display area R1 can be increased, images can be displayed with a large size, thereby enhancing the viewability of images.

There is a case, however, that the user wishes to change the screen mode during display of image contents. For instance, there is a case that a digest image is broadcast in a sports news menu in a news program. In view of the above, in this embodiment, there is provided a button for allowing the user to switch the screen mode. For instance, the R button 8 is used as a switching button. If the R button 8 is depressed while an image is displayed in the small-screen mode in FIG. 6(a), the display control section 120 controls the display screen to be switched from the small-screen mode to the large-screen mode in FIG. 6(b). Alternatively, the switching button may be disposed in the operation area R2.

As described above, the screen modes and the disposition patterns corresponding to the respective genres in the screen setting table are properly set at the time of shipment by the manufacturer. However, it is not always the case that the initially set contents match the user's preference. In view of this, in this embodiment, a setting changing mode is prepared. The user is allowed to change the setting contents of the screen setting table in the setting changing mode by performing a predetermined operation.

Figure 7:
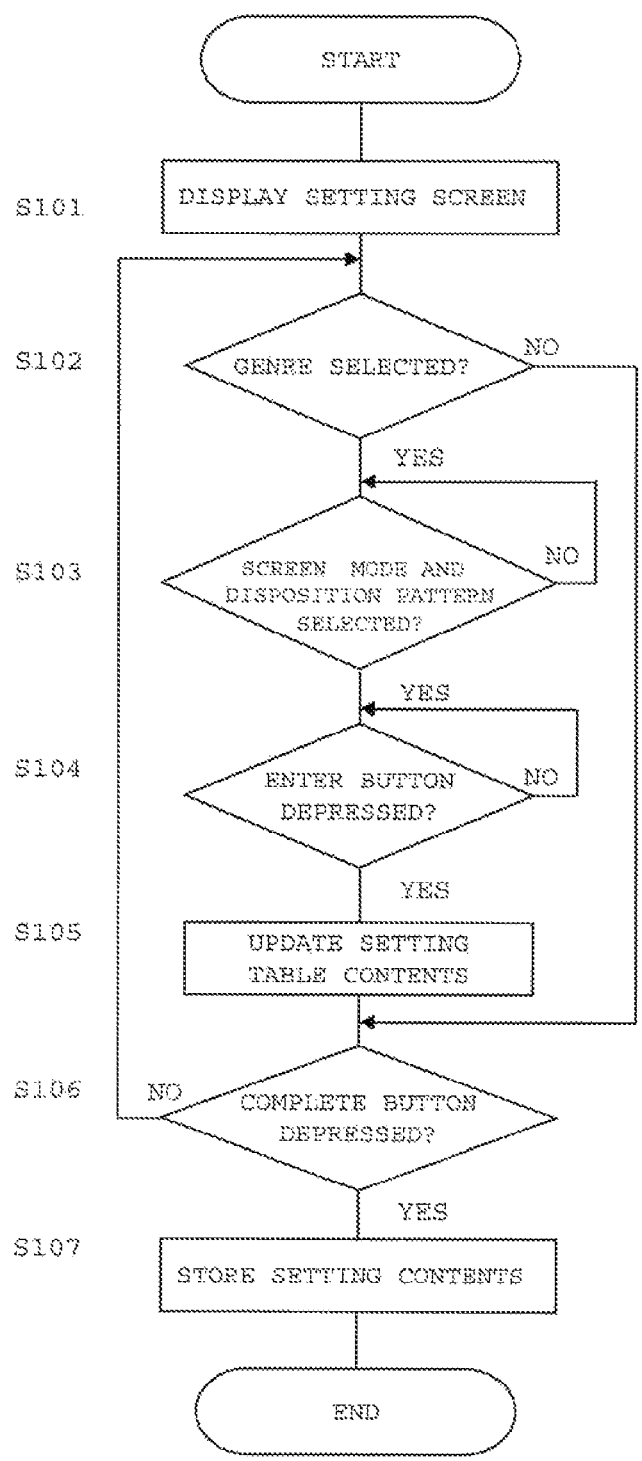
FIG. 7 is a flowchart for describing a control operation relating to changing setting contents of a screen setting table in the mobile phone of the embodiment.
Figure 8:
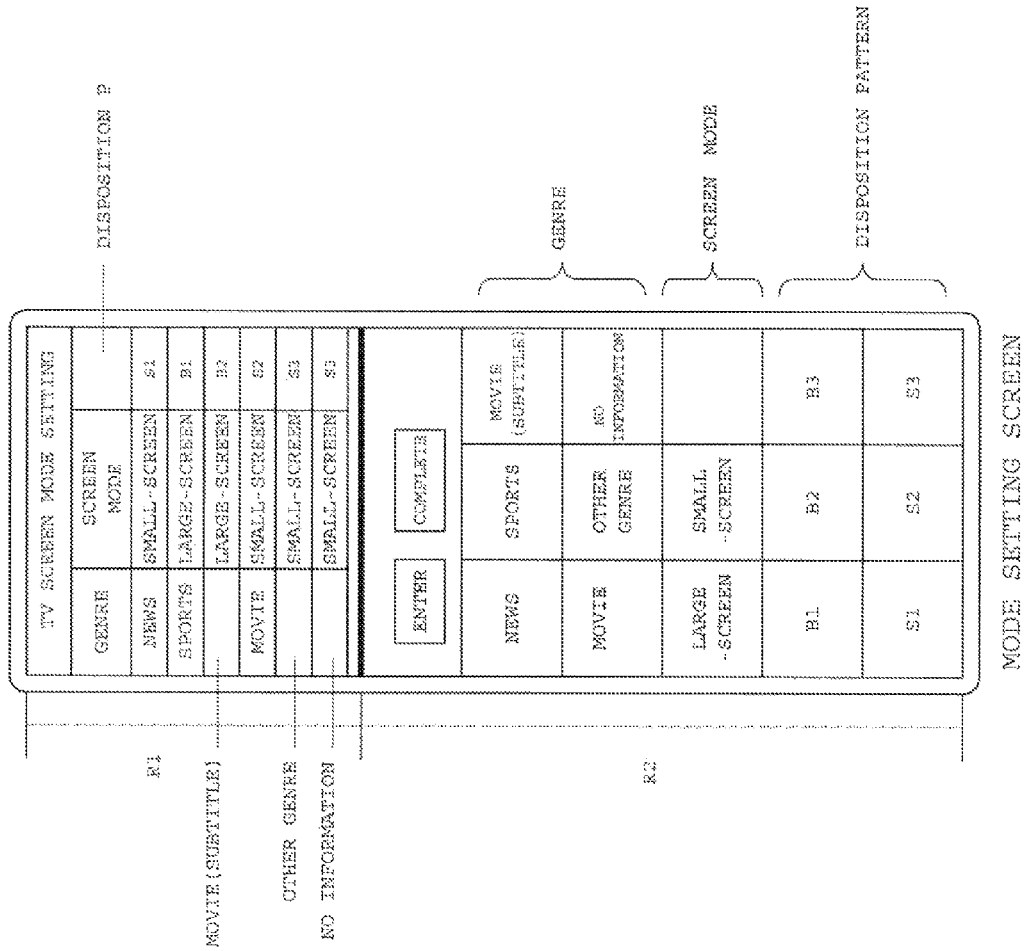
FIG. 8 is a diagram showing a screen display example of a mode setting screen for use in changing setting contents of the screen setting table in the mobile phone of the embodiment.

FIG. 7 is a flowchart for describing a control operation relating to changing the setting contents of the screen setting table. FIG. 8 is a diagram showing a screen display example of a mode setting screen on which the user is allowed to change the setting contents of the screen setting table. In the following, the operation is described.

When an operation of switching to the setting changing mode is performed by the jog dial 7, the display control section 120 outputs an image signal to the liquid crystal display device 600 to cause the liquid crystal display device 600 to display a mode setting screen (Step S101). As shown in FIG. 8, in the mode setting screen, a list showing setting contents is displayed in the display area R1. Further, an enter button, a complete button, and setting buttons on genres, screen modes, and disposition patterns are displayed in the operation area R2.

The screen setting section 130 determines whether a genre has been selected by a setting button (Step S102). If it is determined that a setting button has been depressed (YES in Step S102), the screen setting section 130 determines whether a screen mode and a disposition pattern have been selected by the setting button (Step 5103). If it is determined that the screen mode and the disposition pattern have been selected (YES in Step S103), the screen setting section 130 determines whether the enter button has been depressed (Step S104). If it is determined that the enter button has been depressed (YES in Step S104), the screen setting section 130 updates the setting contents of the selected genre (Step S105). The updated contents are reflected in the list. This allows the user to check the updated contents through the list.

Then, the screen setting section 130 determines whether the complete button has been depressed (Step S106). If it is determined that the complete button has not been depressed (NO in Step S106), the screen setting section 130 returns to Step S210, and determines whether a genre has been selected. Then, if it is determined that a genre has been selected, the screen setting section 130 performs the operations from Step 5103 through Step 5105, and updates the setting contents of the selected genre.

If, on the other hand, it is determined that the complete button has been depressed in Step 5206, the screen setting section 130 saves the updated setting contents into the memory 700 (Step 5107). Thus, the user is allowed to update the setting contents of the screen setting table.

As described above, in this embodiment, there is provided a terminal device with an image display function that enables to effectively enhance viewability of image contents and operability of the terminal device. Specifically, in this embodiment, the display screen is divided into the display area R1 and the operation area R2, and the ratio (screen mode) between the display area R1 and the operation area R2 is changed depending on the genre of image contents. Thus, since the size of the display area R1 can be increased with respect to image contents such as a sports program, wherein images are important for the user as information to be provided, viewability of images can be enhanced. Further, since the size of the operation area R2 can be increased with respect to image contents such as a news program, wherein images are not important for the user as information to be provided, operability relating to image contents can be enhanced.

Further, in the embodiment, in the case where the size of the operation area R2 is changed, the number of function buttons is changed by changing the ratio between the display area R1 and the operation area R2. Accordingly, even if the size of the operation area R2 is decreased, it is not necessary to decrease the size of function buttons by reducing the number of function buttons. This enables to prevent lowering the operability with respect to function buttons.

Furthermore, in the embodiment, since the user is allowed to select the ratio between the display area R1 and the operation area R2 with respect to each of image contents, an image can be displayed according to the user's preference.

Furthermore, in the embodiment, since the ratio between the display area R1 and the operation area R2 is set even in a condition that genre information is not obtained, image contents corresponding to no genre information can be displayed in a proper state.

Furthermore, in the embodiment, since the user is allowed to change the ratio between the display area R1 and the operation area R2 during display of image contents, the size of the display area R1 can be increased, or the size of the operation area R2 can be increased depending on a desired scene. This enhances the convenience of the user.

Furthermore, in the embodiment, since the user is allowed to select a disposition pattern of function buttons in the operation area R2, the user is allowed to select a user-friendly disposition pattern. This enhances the usability of the mobile phone.

The embodiment of the invention has been described as above, but the invention is not limited to the above. Further, the embodiment of the invention may be changed or modified in various ways as necessary, as far as such changes and modifications do not depart from the scope of the claims of the invention hereinafter defined. For instance, the embodiment may be modified as follows.

Figure 9:
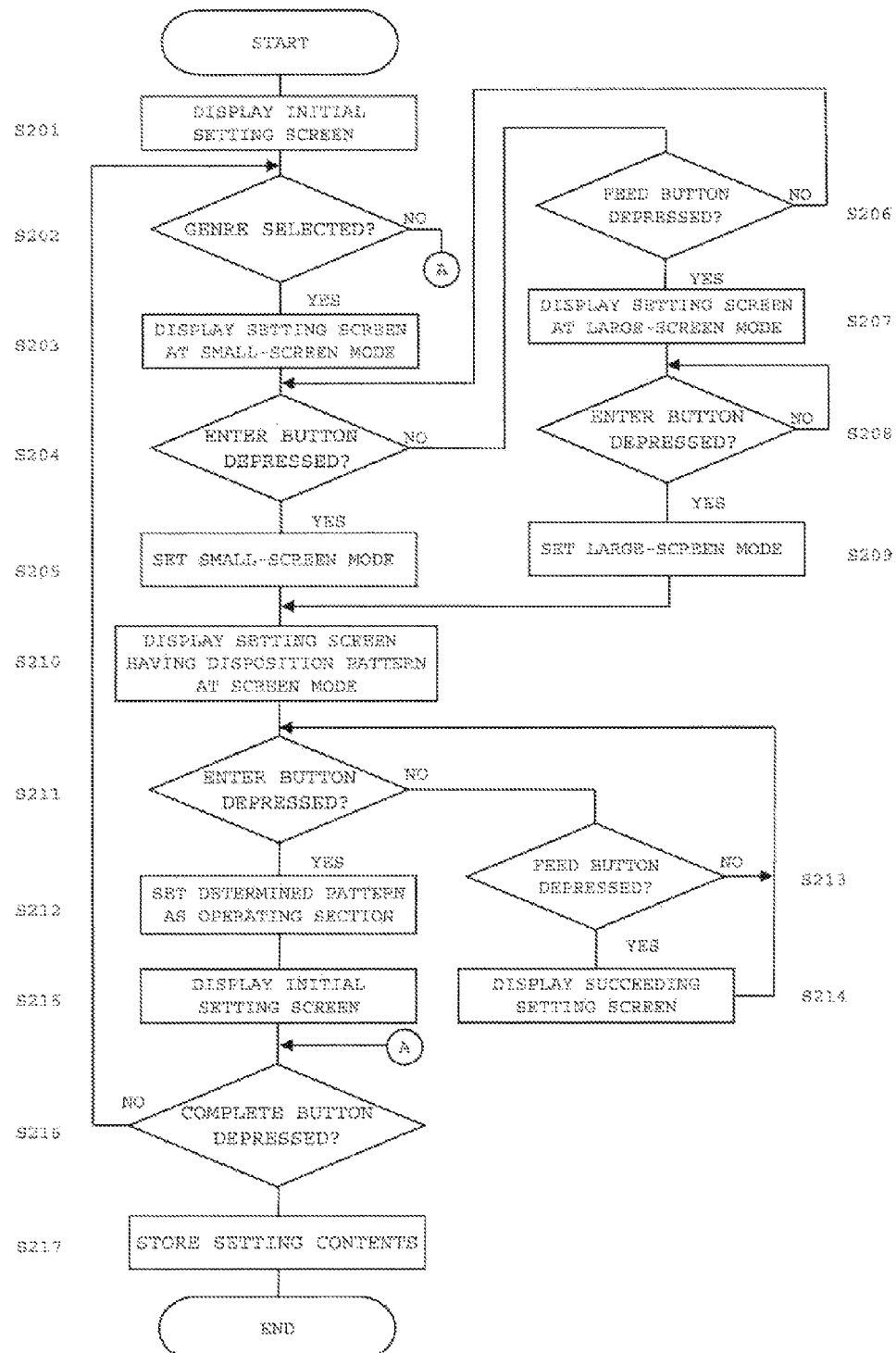
FIG. 9 is a flowchart for describing another control operation relating to changing setting contents of the screen setting table in the mobile phone of the embodiment.
Figure 10:
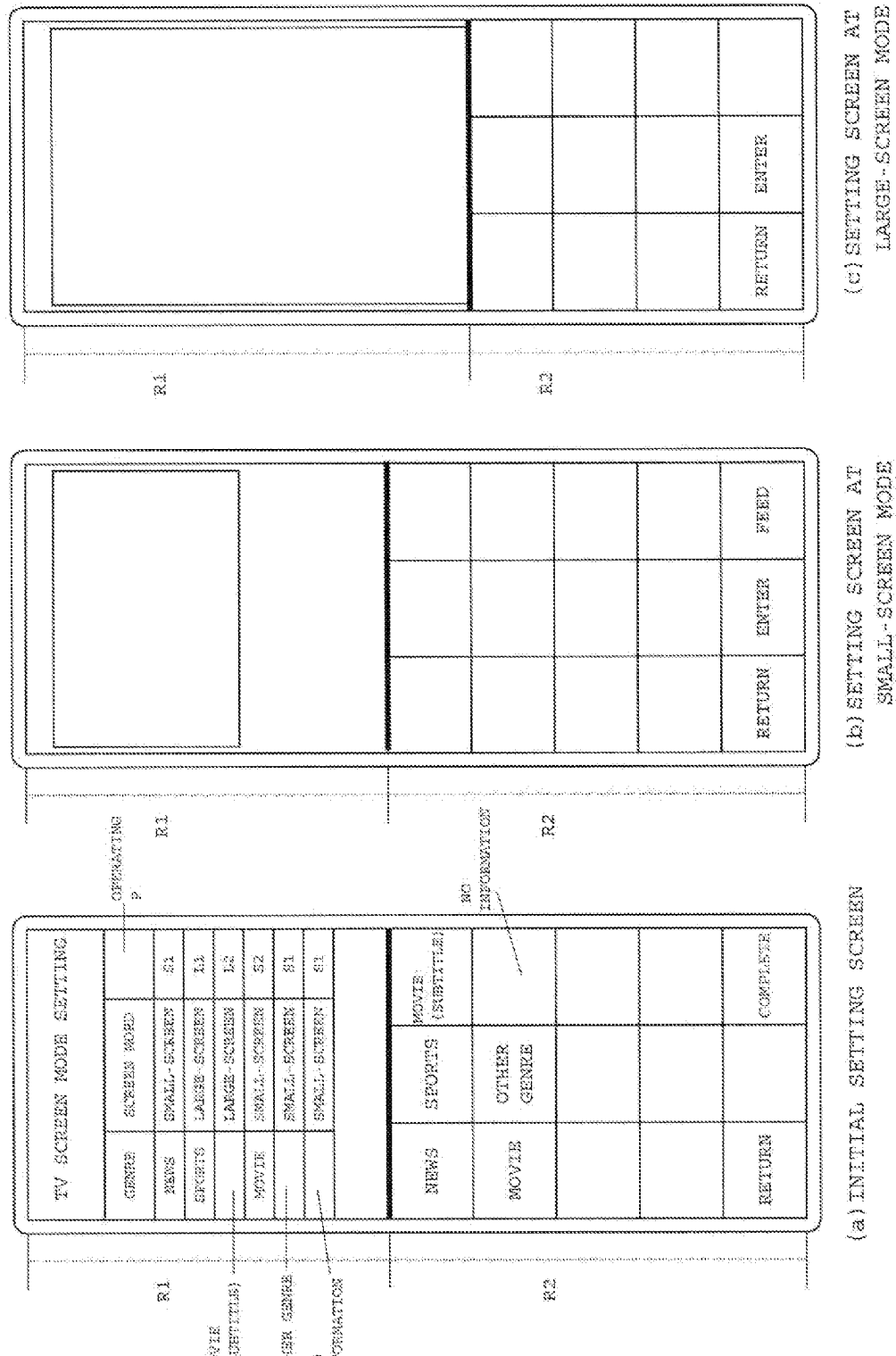
FIG. 10 is diagram showing screen display examples, in the case where the another control operation relating to changing setting contents of the screen setting table is performed in the mobile phone of the embodiment.
Figure 11:
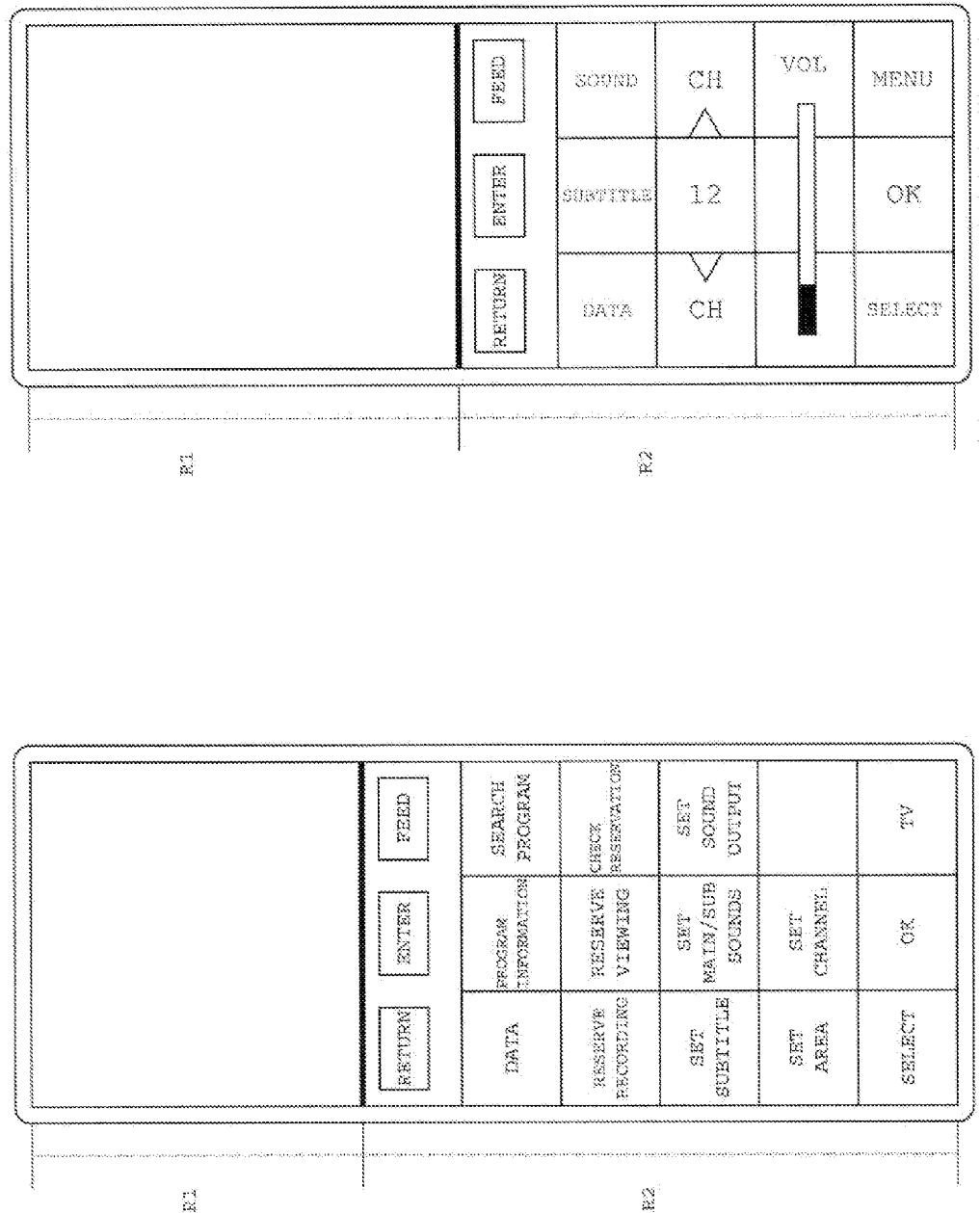
FIG. 11 is diagram showing screen display examples, in the case where the another control operation relating to changing setting contents of the screen setting table is performed in the mobile phone of the embodiment.

FIG. 9 is a flowchart for describing another control operation relating to changing setting contents of the screen setting table. FIG. 10 and FIG. 11 are diagrams showing screen display examples, in the case where another control operation relating to changing setting contents of the screen setting table is performed. In the following, the operation is described.

In response to an operation of switching to the setting changing mode by the jog dial 7, the display control section 120 outputs an image signal to the liquid crystal display device 600, and causes the liquid crystal display device 600 to display an initial setting screen as shown in FIG. 10(a) (Step S201). In the initial setting screen, a list showing setting contents is displayed in the display area R1. Further, a return button, a complete button, and setting buttons on genres are displayed in the operation area R2.

The screen setting section 130 determines whether a genre has been selected by a setting button (Step S202). If it is determined that a setting button has been depressed (YES in Step S202), the screen setting section 130 outputs a command to the display control section 120 to display a setting screen in the small-screen mode. The display control section 120 outputs an image signal to the liquid crystal display device 600 in response to the command, and causes the liquid crystal display device 600 to display a setting screen in the small-screen mode as shown in FIG. 10(b) (Step S203). In the setting screen in the small-screen mode, a display screen, wherein the display area R1 and the operation area R2 are divided with a ratio corresponding to the small-screen mode, is displayed. Further, a return button, an enter button, and a feed button are displayed in the operation area R2.

If the user selects the small-screen mode and depresses the enter button, the screen setting section 130 determines accordingly (YES in Step S204), and sets the screen mode to the small-screen mode (Step S205). If, on the other hand, the user does not select the small-screen mode, and depresses the feed button, the screen setting section 130 determines accordingly (YES in Step S206), and outputs a command to the display control section 120 to display a setting screen in the large-screen mode. The display control section 120 outputs an image signal to the liquid crystal display device 600 in response to the command, and causes the liquid crystal display device 600 to display a setting screen in the large-screen mode as shown in FIG. 10(c) (Step S207). In the setting screen in the large-screen mode, a display screen, wherein the display area R1 and the operation area R2 are divided with a ratio corresponding to the large-screen mode, is displayed. Further, the return button and the enter button are displayed in the operation area R2. If the user selects the large-screen mode, and depresses the enter button, the screen setting section 130 determines accordingly (YES in Step S208), and sets the screen mode to the large-screen mode (Step S209).

After the screen mode setting is completed, the screen setting section 130 outputs a command to the display control section 120 to display a setting screen having a disposition pattern in the selected screen mode. The display control section 120 outputs an image signal to the liquid crystal display device 600 in response to the command, and causes the liquid crystal display device 600 to display a setting screen having a disposition pattern in the selected screen mode, as shown in FIG. 11 (Step S210). In the case of the small-screen mode, a first disposition pattern S1 to be disposed in the operation area R2 in the small-screen mode, as shown in FIG. 11(a), is actually displayed in the operation area R2.

If the user selects the disposition pattern S1, and depresses the enter button, the screen setting section 130 determines accordingly (YES in Step S211), and sets the disposition pattern 51 as an operating section (Step S212). If, on the other hand, the user does not select the disposition pattern S1, and depresses the feed button, the screen setting section 130 determines accordingly (YES in Step S213), and outputs a command to the display control section 120 to display a setting screen having a succeeding disposition pattern S2. Then, the setting screen having the succeeding disposition pattern S2 is displayed (Step S214). In this way, if the user depresses the feed button without depressing the enter button, the disposition patterns are successively displayed, and the disposition pattern at which the enter button has been depressed is set as an operating section. In the case of the large-screen mode, as shown in FIG. 11(b), a first disposition pattern B1 to be disposed in the operation area R2 in the large-screen mode is actually displayed in the operation area R2. In this case, a disposition pattern is set by performing the same operations (Step 5211 through Step 5214) as described above.

After the disposition pattern setting is completed, the screen setting section 130 outputs a command to the display control section 120 to display the initial setting screen. As a result of the above operation, the initial setting screen is displayed again (Step S215). When the initial setting screen is displayed, updated contents are reflected in the list, and the user is allowed to check the updated contents through the list.

Then, the screen setting section 130 determines whether the complete button has been depressed (Step S216). If it is determined that the complete button has not been depressed (NO in Step S216), the screen setting section 130 returns to Step S202, and determines whether a genre has been selected. If it is determined that a genre has been selected, the screen setting section 130 performs the operations from Step 5203 through Step S214, and updates the setting contents of the selected genre.

If, on the other hand, it is determined that the complete button has been depressed in Step 5216 (YES in Step S216), the screen setting section 130 saves the updated setting contents into the memory 700 (Step S217).

In the above arrangement, a state of a screen mode (the ratio between the display area and the operation area), and the contents of a disposition pattern are actually displayed on the display screen, and the user is allowed to actually check the state and the contents on the display screen. This allows the user to easily perform a setting operation without a manual or like means.

Further, in the embodiment, the number of function buttons is changed depending on the size of the operation area R2. Specifically, in the small-screen mode where the size of the operation area R2 is large, the number (function number) of function buttons is large, as compared with the large-screen mode. Alternatively, the size of function buttons may be changed depending on the size of the operation area R2. In the modification, the size of function buttons can be increased by increasing the size of the operation area R2. This is user-friendly to e.g. elderly people.

Furthermore, in the embodiment, the patterns on the ratio (screen mode) between the display area R1 and the operation area R2 are two patterns i.e. the small-screen mode and the large-screen mode. Alternatively, the patterns may be three or more patterns.

The embodiment of the invention may be changed or modified in various ways as necessary, as far as such changes and modifications do not depart from the scope of the claims of the invention hereinafter defined.

What is claimed is:

1. A terminal device with an image display function, comprising:
    a display section;
    a display control section which divides a display area of the display section into a first display area for displaying image contents, and a second display area for allowing a user to perform an input operation;
    a storing section which stores first information relating to a ratio between the first display area and the second display area based on a genre of the image contents; and
    a determining section which determines the genre of the image contents to be displayed, wherein
    the display control section reads out, from the storing section, the first information corresponding to the genre determined by the determining section, and divides the display area into the first display area and the second display area, based on the determined genre.

2. The terminal device with the image display function according to claim 1, wherein
    the display control section changes the number of operation keys to be displayed on the second display area depending on the first information.

3. The terminal device with the image display function according to claim 1, further comprising:
    a changing section which changes the ratio in association with the genre in response to an external operation.

4. The terminal device with the image display function according to claim 1, wherein
    the storing section stores second information relating to the ratio, the second information not being associated with the genre, and
    the display control section reads out the second information from the storing section, and divides the display area into the first display area and the second display area based on the second information, in the case where the genre is not determined by the determining section.

5. The terminal device with the image display function according to claim 1, wherein
    the display control section switches the ratio between the first display area and the second display area to another ratio in response to an external operation, while the image contents are displayed.

6. The terminal device with the image display function according to claim 1, further comprising:
    a key pattern setting section which sets a disposition pattern of operation keys to be displayed on the second display area in response to an external operation.

7. A terminal device with an image display function, comprising:
    a display section;
    a display control section which divides a display area of the display section into a first display area for displaying a screen based on a function performed by the terminal device, and a second display area for allowing a user to perform an input operation;
    a storing section which stores first information relating to a ratio between the first display area and the second display area in association with a type of function performed by the terminal device; and
    a determining section which determines a type of function performed by the terminal device, wherein
    the display control section reads out, from the storing section, the first information corresponding to the function type determined by the determining section, and divides the display area into the first display area and the second display area, based on the first information.

8. A display control method of a terminal device with an image display function, which includes a storing section which stores first information relating to a ratio between a first display area and a second display area in association with a type of function performed by the terminal device, the first display area being an area for displaying a screen based on a function performed by the terminal device and the second display area being an area for allowing a user to perform an input operation, the method comprising the steps of:
    determining a type of function performed by the terminal device; and
    reading out, from the storing section, the first information corresponding to the determined function type, and dividing the display area of the terminal device into the first display area and the second display area, based on the first information.

* * * * *